United States Patent
Dar et al.

(10) Patent No.: US 12,530,124 B2
(45) Date of Patent: Jan. 20, 2026

(54) SYSTEM AND METHOD FOR MACHINE LEARNING-BASED FORECASTING OF ACTIVE DATA SETS IN STORAGE SYSTEMS

(71) Applicant: Dell Products L.P., Round Rock, TX (US)

(72) Inventors: Shaul Dar, Petach Tikva (IL); Amitai Alkalay, Kadima (IL); Ramakanth Kanagovi, Hyderabad (IN); Guhesh Swaminathan, Tamil Nadu (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/627,707

(22) Filed: Apr. 5, 2024

(65) Prior Publication Data

US 2025/0315163 A1    Oct. 9, 2025

(51) Int. Cl.
*G06F 3/06* (2006.01)

(52) U.S. Cl.
CPC .......... *G06F 3/0613* (2013.01); *G06F 3/0631* (2013.01); *G06F 3/067* (2013.01)

(58) Field of Classification Search
CPC ....... G06F 3/0613; G06F 3/0631; G06F 3/067
USPC .......................................... 711/154
See application file for complete search history.

(56) References Cited

U.S. PATENT DOCUMENTS

| | | | |
|---|---|---|---|
| 11,137,926 B1 * | 10/2021 | Pendharkar | G06F 3/0611 |
| 2020/0034194 A1 * | 1/2020 | Szczepanik | G06N 20/00 |
| 2020/0285386 A1 * | 9/2020 | Nelogal | G06F 7/582 |
| 2024/0143174 A1 * | 5/2024 | Dar | G06F 3/0653 |
| 2024/0256912 A1 * | 8/2024 | Dar | G06N 20/20 |
| 2024/0281168 A1 * | 8/2024 | Roach | G06F 12/0882 |

* cited by examiner

*Primary Examiner* — Than Nguyen
(74) *Attorney, Agent, or Firm* — Brian J. Colandreo; Heath M. Sargeant; Holland & Knight LLP (57) ABSTRACT

A method, computer program product, and computing system for processing a plurality of historical input/output (IO) requests associated with a storage object of a storage system. A plurality of IO features may be generated using the plurality of historical IO requests. An active data set for the storage object may be forecasted for a particular future time interval using a machine learning model based upon, at least in part, the plurality of IO features.

14 Claims, 8 Drawing Sheets

SYSTEM AND METHOD FOR MACHINE LEARNING-BASED FORECASTING OF ACTIVE DATA SETS IN STORAGE SYSTEMS

BACKGROUND

The ability to forecast the future activity of objects such as files, volumes, or extents, in a storage system, can enable significant performance gains. One important characteristic of such a storage system is the active data set (ADS), which is the subset of the entire data stored on the storage device which is currently "active", meaning it is being read and/or written.

Using a supervised machine learning model to forecast the future level of activity of storage objects, such as volumes or slices, allows for tiering or caching with a higher "hit" ratio (i.e., the probability of finding the storage object, such as a slice, which is the target of the input-output (IO) operation, in a top tier or in the cache), thus significantly lowering the overall average latency. The level of activity is often referred to as the "temperature" of the storage object, where an active object is considered "hot" and an inactive object is considered "cold". The temperature may be defined in terms of the number of IO operations performed by the storage object in a given time unit, the total number of bytes transferred, or some combination of similar metrics. However, a forecast of storage object temperature cannot forecast the amount of data in the active data set.

SUMMARY OF DISCLOSURE

In one example implementation, a computer-implemented method executed on a computing device may include, but is not limited to, processing a plurality of historical input/output (IO) requests associated with a storage object of a storage system. A plurality of IO features may be generated using the plurality of historical IO requests. An active data set for the storage object may be forecasted for a particular future time interval using a machine learning model based upon, at least in part, the plurality of IO features.

One or more of the following example features may be included. The active data set for a storage object is a set of data within the storage object that is actively being read and/or written by one or more IO requests. The plurality of IO features may include one or more of: an average amount of time between consecutive IO requests during a time interval; a total amount of IO requests during the time interval; a total amount of bandwidth during the time interval; an average IO request size during the time interval; an average amount of time between consecutive read IO requests during the time interval; a frequency of activity during the time interval; and an average amount of time between active time intervals of the plurality of time intervals. An active data set may be forecast for a storage system for the particular future time interval by aggregating the forecast active data set for each storage object of the storage system for the particular future time interval. An amount of cache storage capacity may be allocated for caching user data based upon, at least in part, the forecasting of the active data set for the storage system. An amount of metadata may be allocated to manage user data based upon, at least in part, the forecasting of the active data set for the storage system. Resource balancing may be performed in the storage system among a plurality of storage nodes based upon, at least in part, the forecasting of the active data set for the storage system.

In another example implementation, a computer program product resides on a computer readable medium that has a plurality of instructions stored on it. When executed by a processor, the instructions cause the processor to perform operations that may include, but are not limited to, processing a plurality of historical input/output (IO) requests associated with a storage object of a storage system. A plurality of IO features may be generated using the plurality of historical IO requests. An active data set for the storage object may be forecasted for a particular future time interval using a machine learning model based upon, at least in part, the plurality of IO features.

One or more of the following example features may be included. The active data set for a storage object is a set of data within the storage object that is actively being read and/or written by one or more IO requests. The plurality of IO features may include one or more of: an average amount of time between consecutive IO requests during a time interval; a total amount of IO requests during the time interval; a total amount of bandwidth during the time interval; an average IO request size during the time interval; an average amount of time between consecutive read IO requests during the time interval; a frequency of activity during the time interval; and an average amount of time between active time intervals of the plurality of time intervals. An active data set may be forecast for a storage system for the particular future time interval by aggregating the forecast active data set for each storage object of the storage system for the particular future time interval. An amount of cache storage capacity may be allocated for caching user data based upon, at least in part, the forecasting of the active data set for the storage system. An amount of metadata may be allocated to manage user data based upon, at least in part, the forecasting of the active data set for the storage system. Resource balancing may be performed in the storage system among a plurality of storage nodes based upon, at least in part, the forecasting of the active data set for the storage system.

In another example implementation, a computing system includes at least one processor and at least one memory architecture coupled with the at least one processor, wherein the at least one processor is configured to process a plurality of historical input/output (IO) requests associated with a storage object of a storage system. A plurality of IO features may be generated using the plurality of historical IO requests. An active data set for the storage object may be forecasted for a particular future time interval using a machine learning model based upon, at least in part, the plurality of IO features.

One or more of the following example features may be included. The active data set for a storage object is a set of data within the storage object that is actively being read and/or written by one or more IO requests. The plurality of IO features may include one or more of: an average amount of time between consecutive IO requests during a time interval; a total amount of IO requests during the time interval; a total amount of bandwidth during the time interval; an average IO request size during the time interval; an average amount of time between consecutive read IO requests during the time interval; a frequency of activity during the time interval; and an average amount of time between active time intervals of the plurality of time intervals. An active data set may be forecast for a storage system for the particular future time interval by aggregating the forecast active data set for each storage object of the storage system for the particular future time interval. An amount of cache storage capacity may be allocated for caching user data based upon, at least in part, the forecasting of the active data set for the storage system. An amount of metadata may be allocated to manage user data based upon, at least in part, the forecasting of the active data set for the storage system. Resource balancing may be performed in the storage system among a plurality of storage nodes based upon, at least in part, the forecasting of the active data set for the storage system.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
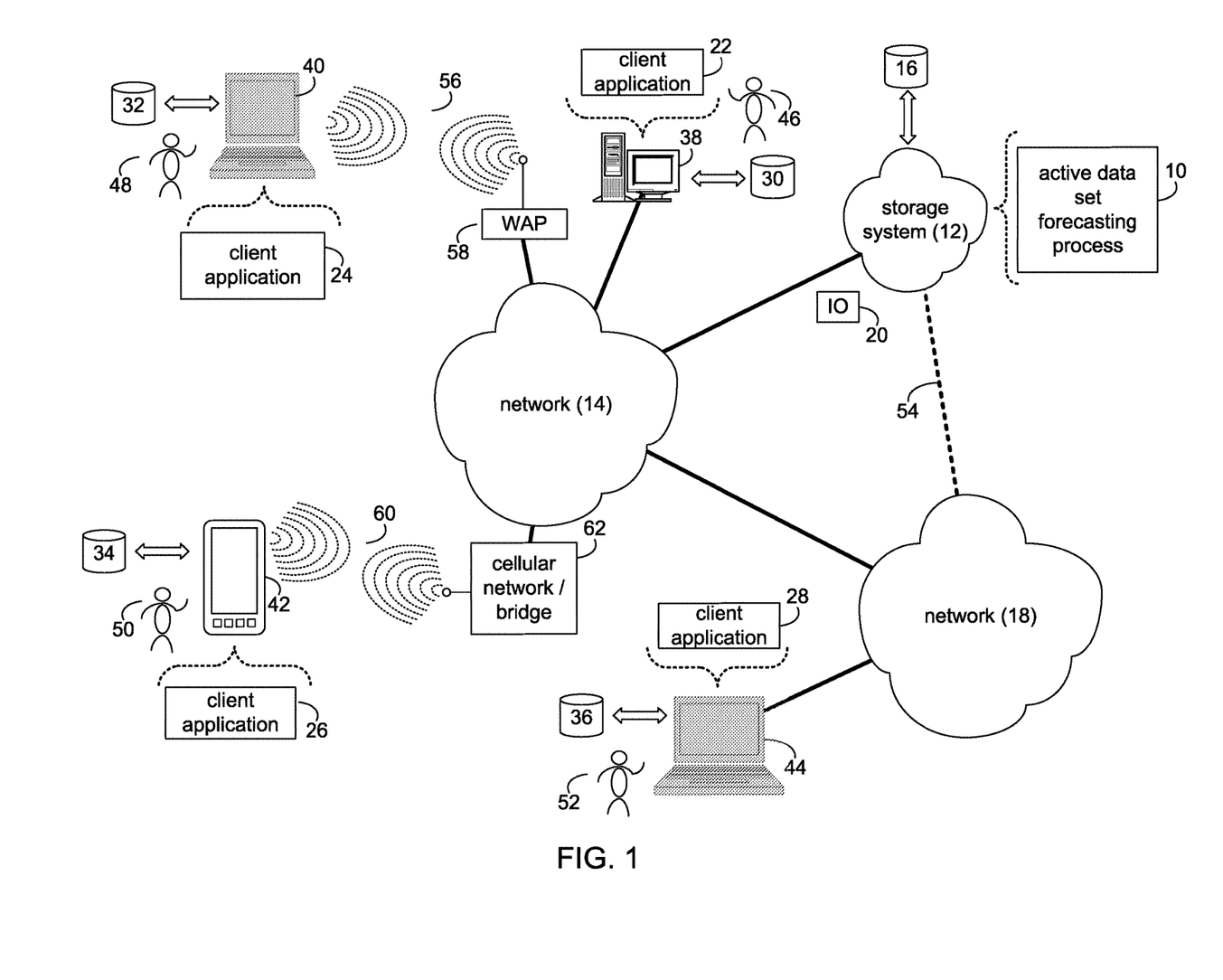
FIG. 1 is an example diagrammatic view of a storage system and a active data set forecasting process coupled to a distributed computing network according to one or more example implementations of the disclosure.

System Overview:

Referring to FIG. 1, there is shown active data set forecasting process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of active data set forecasting process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of active data set forecasting process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a active data set forecasting process, such as active data set forecasting process 10 of FIG. 1, may include but is not limited to, processing a plurality of historical input/output (IO) requests associated with a storage object of a storage system. A plurality of IO features may be generated using the plurality of historical IO requests. An active data set for the storage object may be forecasted for a particular future time interval using a machine learning model based upon, at least in part, the plurality of IO features.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
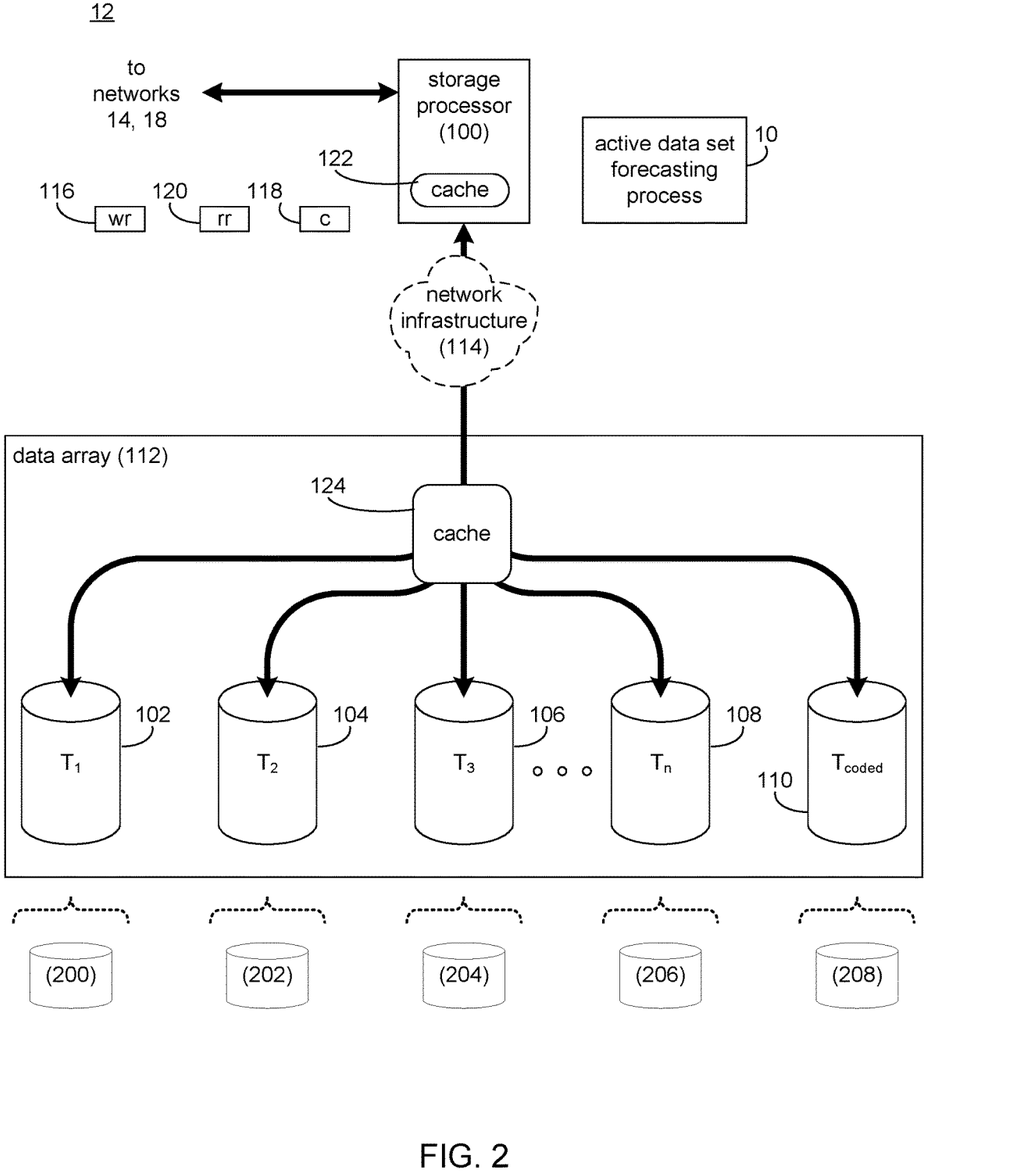
FIG. 2 is an example diagrammatic view of the storage system of FIG. 1 according to one or more example implementations of the disclosure.
Figure 3:
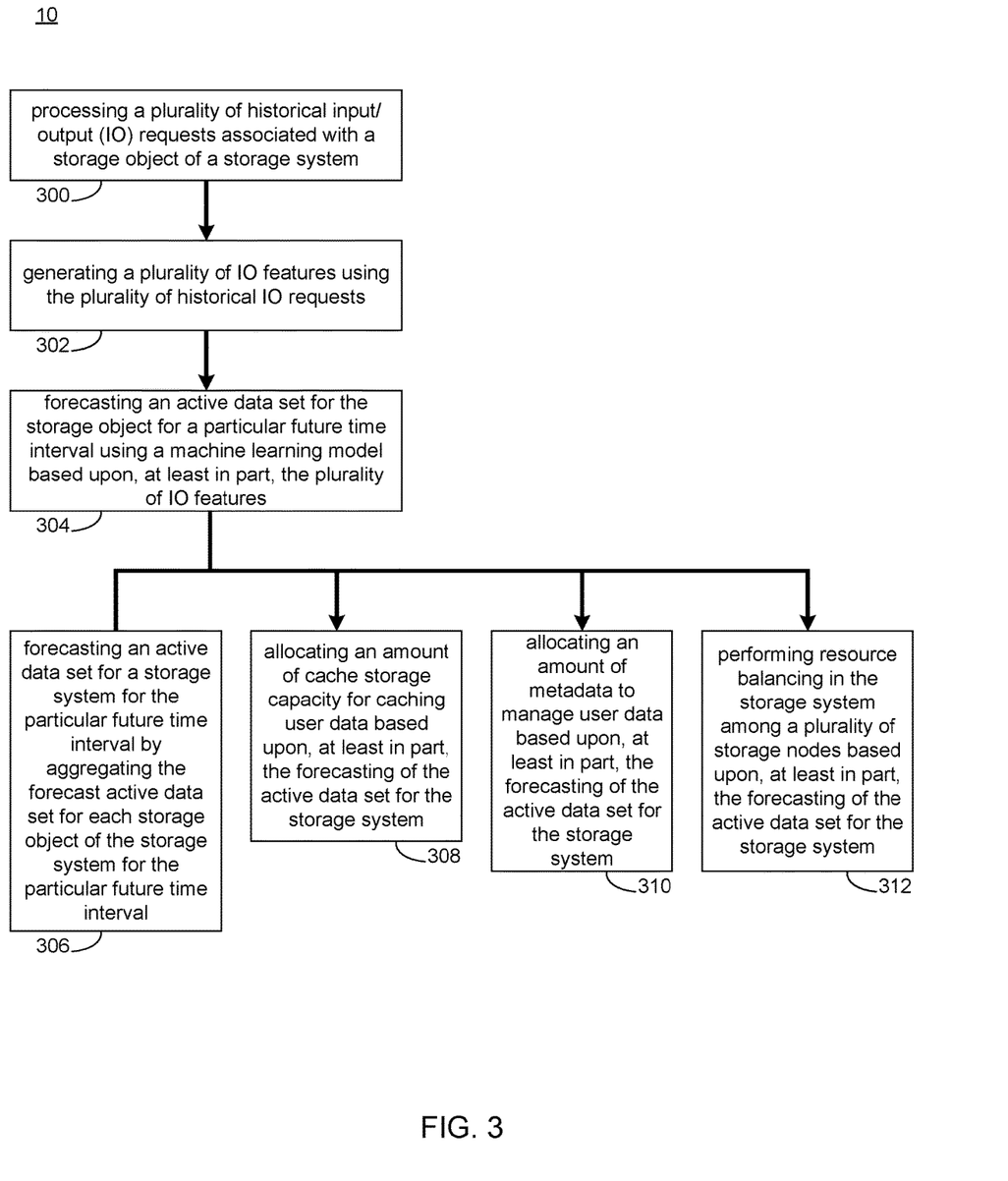
FIG. 3 is an example flowchart of active data set forecasting process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of active data set forecasting process 10. The instruction sets and subroutines of active data set forecasting process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of active data set forecasting process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of active data set forecasting process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of active data set forecasting process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Active Data Set Forecasting Process:

Referring also to the examples of FIGS. 3-8 and in some implementations, active data set forecasting process 10 may process 300 a plurality of historical input/output (IO) requests associated with a storage object of a storage system. A plurality of IO features may be generated 302 using the plurality of historical IO requests. An active data set for the storage object may be forecasted 304 for a particular future time interval using a machine learning model based upon, at least in part, the plurality of IO features.

As will be discussed in greater detail below, implementations of the present disclosure may allow for accurate forecasting of the active data set for an individual storage object and/or the overall active data set for the storage system. For example, active data set forecasting process 10 enables a machine learning model (e.g., a machine learning regression model) to predict the future active data set values (for different time intervals, e.g., 10 minutes, 1 hour, 1 day, 1 week) for individual storage objects such as files, volumes, or extents. In some implementations, active data set forecasting process 10 aggregates the individual forecasts of distinct storage objects to forecast the active data set of the entire storage system for that particular future time interval.

In some implementations, active data set forecasting process 10 processes 300 a plurality of historical input/output (IO) requests associated with a storage object of a storage system. For example and referring again to FIG. 2, during the operation of a storage system (e.g., storage system 12), IO operations may be generated for processing data on various storage objects (e.g., storage objects 200, 202, 204, 206, 208). Storage objects (e.g., storage objects 200, 202, 204, 206, 208) may generally include any container or storage unit configured to store data within a storage system (e.g., storage system 12). For example, a storage object may be any one of the following: a volume (aka Logical Unit Number (LUN)), a file, or parts thereof that may be defined e.g. by offsets or address ranges (e.g., sub-LUNs, disk extents, and/or slices). In some implementations, the plurality of storage objects include a block storage object and/or a file storage object. A block storage object is a block or chunk of storage that can be accessed by various operating systems. In some implementations, a file storage object is a folder or subset of a hierarchical data structure accessible by a particular path within the hierarchical data structure.

Figure 4:
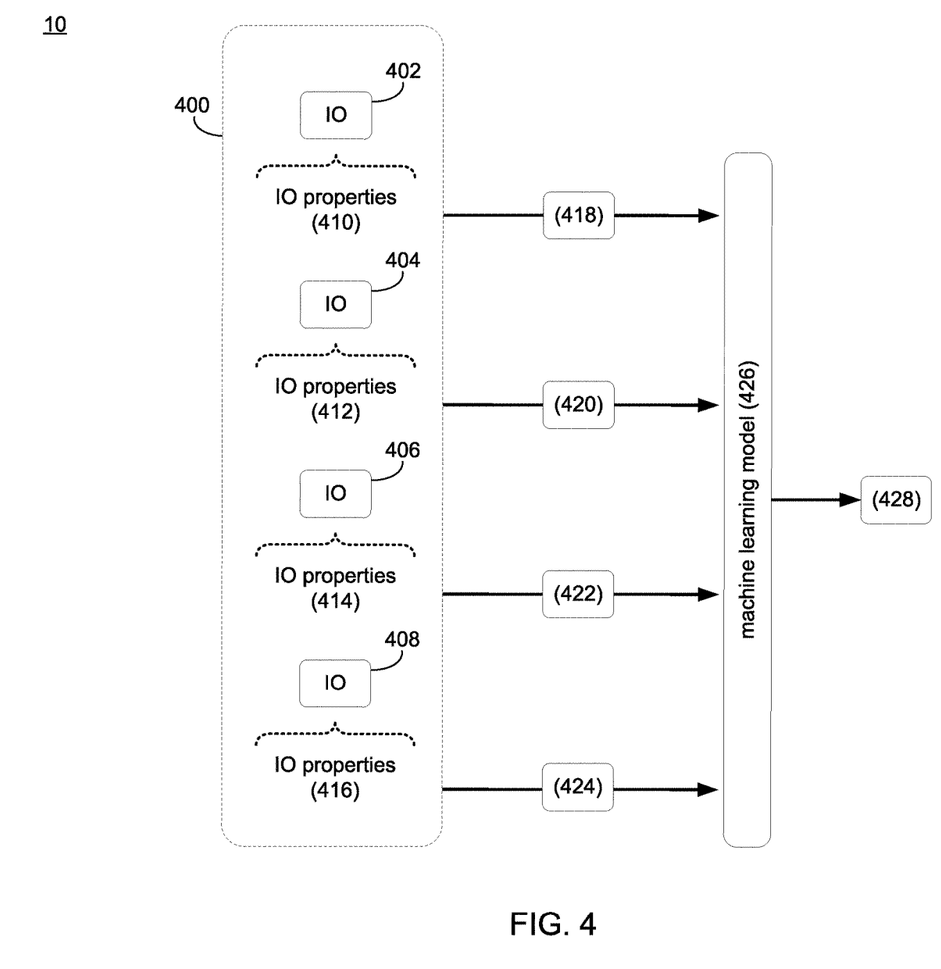
FIG. 4 is an example diagrammatic view of the training of a machine learning model according to one or more example implementations of the disclosure.

Referring also to FIG. 4, a plurality of IO requests (e.g., plurality of IO requests 400) may include e.g., four IO requests associated with various storage objects and/or the same storage object. IO request 402 may include a request to perform a read IO operation on a first storage object (e.g., storage object 200); IO request 404 may include a request to perform a write IO operation on storage object 200; IO request 406 may include a request to perform a read IO operation on storage object 200; and IO request 408 may include a request to perform an operation on storage object 200. While four separate IO requests for a single storage object have been described, it will be appreciated that this is for example purposes only and that any number of IO requests may be received for any number of storage objects within the present disclosure.

In some implementations, active data set forecasting process 10 generates 302 a plurality of IO features using the plurality of historical IO requests. An IO feature is a representation of a plurality of IO properties associated with a particular storage object over a period of time. In some implementations, an IO feature is used by a machine learning model to identify trends indicative of a ransomware attack involving the storage object. Examples of IO features include a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests; etc. Examples of IO features are provided below in Table 1:

TABLE 1

| Feature Name | Description |
| --- | --- |
| IOPS | IO per second over sample interval |
| Total Reads | Sum of read events |
| Total Writes | Sum of write events |
| Total Others (non-IO) | Sum of all other events |
| Percentage reads (%) | % of reads events |
| Percentage writes (%) | % of write events |
| Percentage others (%) | % of other events |
| Average 'read' size | Average length of read IO |
| Average 'write' size | Average length of write IO |
| Std deviation of 'read' size | Standard deviation in read io length |
| Std deviation of 'write' size | Standard deviation in write IO length |
| Time consecutive IOs (avg) | Average interarrival rate of any IO |
| Time consecutive reads (avg) | Average interarrival rate of read IO |
| Time consecutive writes (avg) | Average interarrival rate of write IO |
| Delta consecutive IOs (avg) | Average difference in logical block address (LBA) between IO |
| Delta consecutive reads (avg) | Average difference in LBA between reads |
| Delta consecutive writes (avg) | Average difference in LBA between writes |
| Consecutive read-read (%) | % of consecutive IO pairs that are both read |
| Consecutive read-write (%) | % of consecutive IO pairs that are read followed by write |
| Consecutive write-read (%) | % of consecutive IO pairs that are write followed by read |
| Consecutive write-write (%) | % of consecutive IO pairs that are both write |
| Sequential read (%) | % of consecutive read pairs such that the 2nd one begins at the address where the 1st one ended (i.e., LBA + size) |
| Sequential write (%) | % of consecutive write pairs such that the 2nd one begins at the address where the 1st one ended (i.e., LBA + size) |
| Immediate write-over-read | % of consecutive IO pairs that are read followed by write, and the write is over the same address range as the read. |
| Delayed write-over-read | % of IO pairs in a sequence of size "N" (e.g., N = 100) that are read followed by write over the same address range. |
| Average write entropy | The average entropy of the address range that was written (between 0 and 1) |
| Average write entropy change | The average change in entropy (from before to after) of the address range that was written (between 0 and 1) |

In some implementations, active data set forecasting process 10 generates 302 the plurality of IO features by extracting salient data elements (e.g., one or more IO properties) such as volume ID, timestamp, IO command type (e.g. read, write, unmap, etc.), logical block address (LBA) (i.e., an offset in the data path's thin address space), length, pattern (e.g., sequential, random, caterpillar, IO-stride), etc. from the plurality of IO requests. In this manner, active data set forecasting process 10 may extract various IO properties associated with the plurality of IO requests. Referring again to FIG. 4 and in some implementations, active data set forecasting process 10 may extract one or more IO properties from plurality of IO requests 400. For example, active data set forecasting process 10 may extract IO properties 418 from IO request 402; IO properties 420 from IO request 404; IO properties 422 from IO request 406; and IO properties 424 from IO request 408.

In some implementations, generating 302 the plurality of IO features using the plurality of IO requests includes aggregating the plurality of IO requests periodically, and generating the plurality of IO features using the aggregated plurality of IO requests. For example, active data set forecasting process 10 may aggregate the one or more IO properties periodically to optimize for memory/storage requirements and/or CPU costs. Additionally, active data set forecasting process 10 may use a sampling approach where IO properties for every "n"th IO request are extracted. In some implementations, the number of IO requests between extracting the one or more IO properties may be user-defined, a default number of IO requests, and/or defined automatically by active data set forecasting process 10. In this manner, active data set forecasting process 10 may limit the amount of processing of IO requests to generate IO features by sampling and aggregating a limited set of all of the IO requests received at the storage system. Referring again to FIG. 4 and in some implementations, active data set forecasting process 10 may aggregate IO properties 410 from IO request 402; IO properties 412 from IO request 404; IO properties 414 from IO request 406; and IO properties 416 from IO request 408 and generate a plurality of IO features (e.g., IO features 418, 420, 422, 424).

In some implementations, active data set forecasting process 10 forecasts 304 an active data set for the storage object for a particular future time interval using a machine learning model based upon, at least in part, the plurality of IO features. An active data set for a storage object is a set of data within the storage object that is actively being read and/or written by one or more IO requests. Referring also to FIGS. 5-8, the plurality of historical IO requests (e.g., IO requests 402, 404, 406, 408) include requests to perform operations on data stored within storage object 200 within a particular time interval. For example, a time interval includes a defined period of time in which IO requests are processed or may be processed for a storage object. In this example, the time interval is the amount of time in which IO requests 402, 404, 406, 408 are processed (e.g., one minute). However, it will be appreciated that the time interval may be any value (e.g., microseconds, milliseconds, seconds, minutes, hours, days, weeks, months, etc.) within the scope of the present disclosure.

Figure 5:
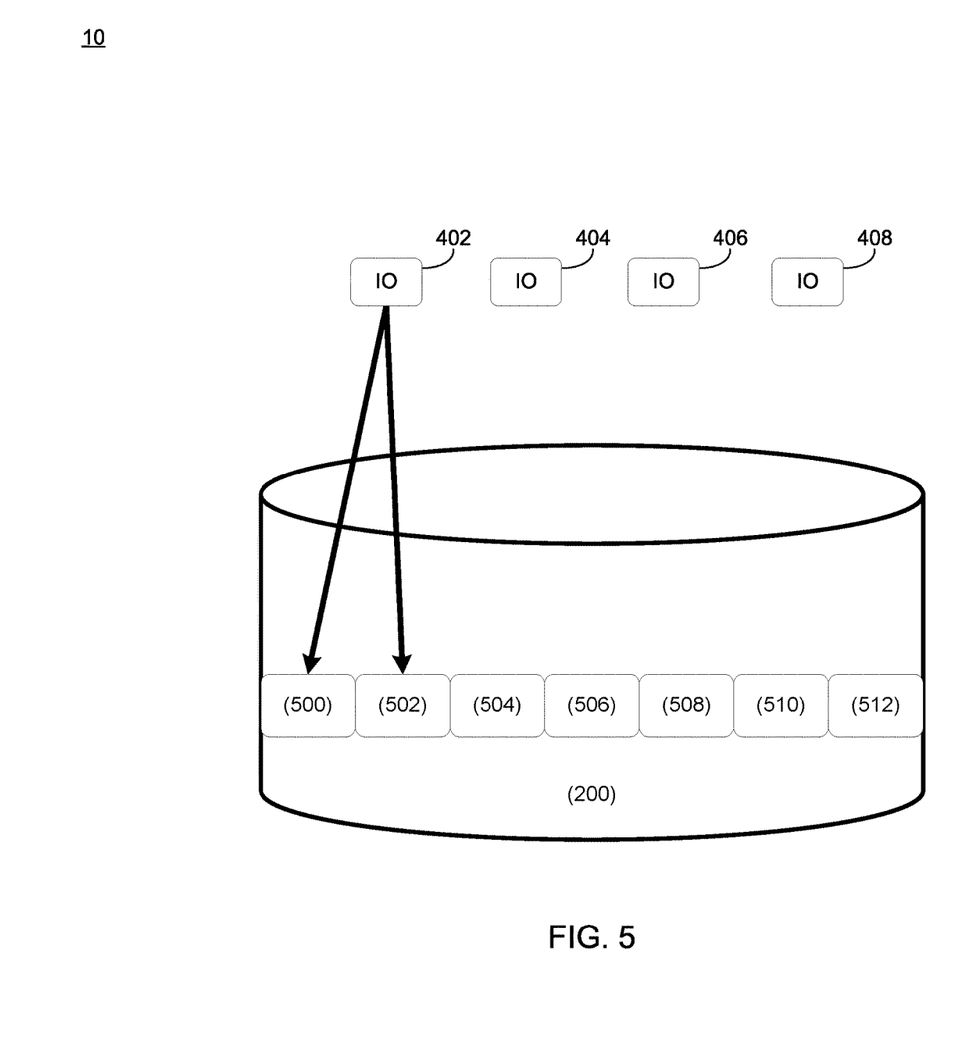
FIGS. 5-8 are example diagrammatic views of an active data set for a storage object for a particular time interval according to one or more example implementations of the disclosure.
Figure 6:
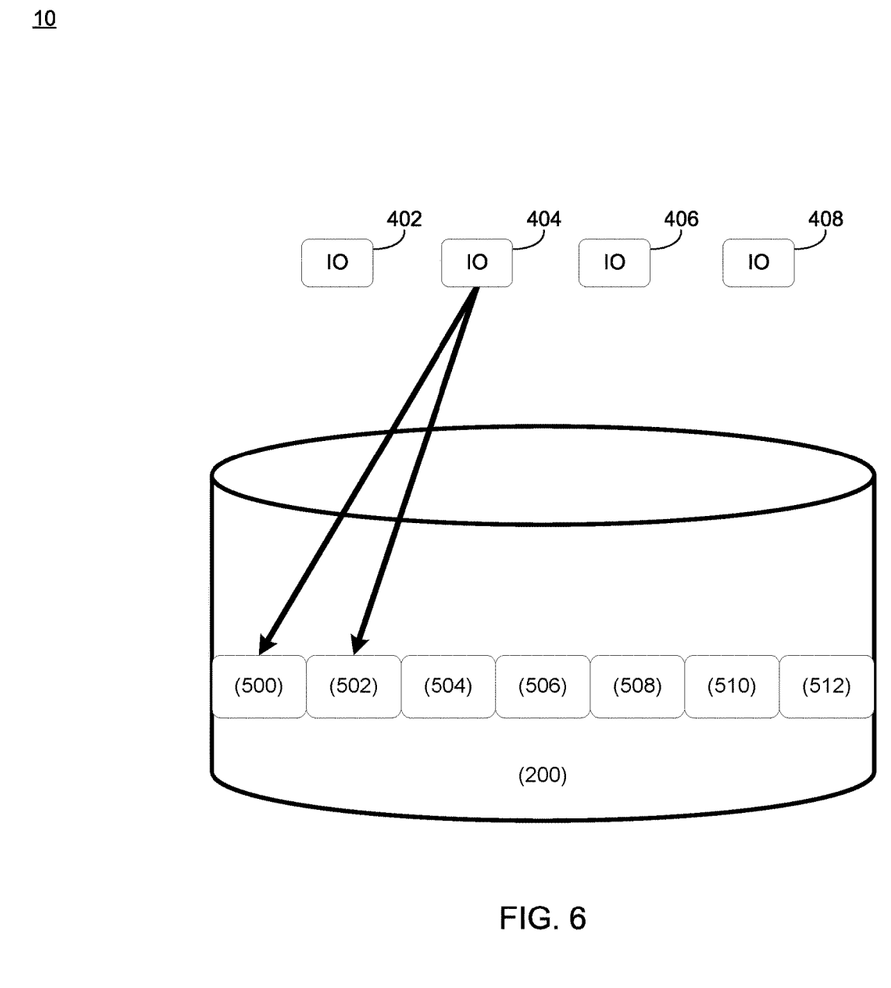
Figure 7:
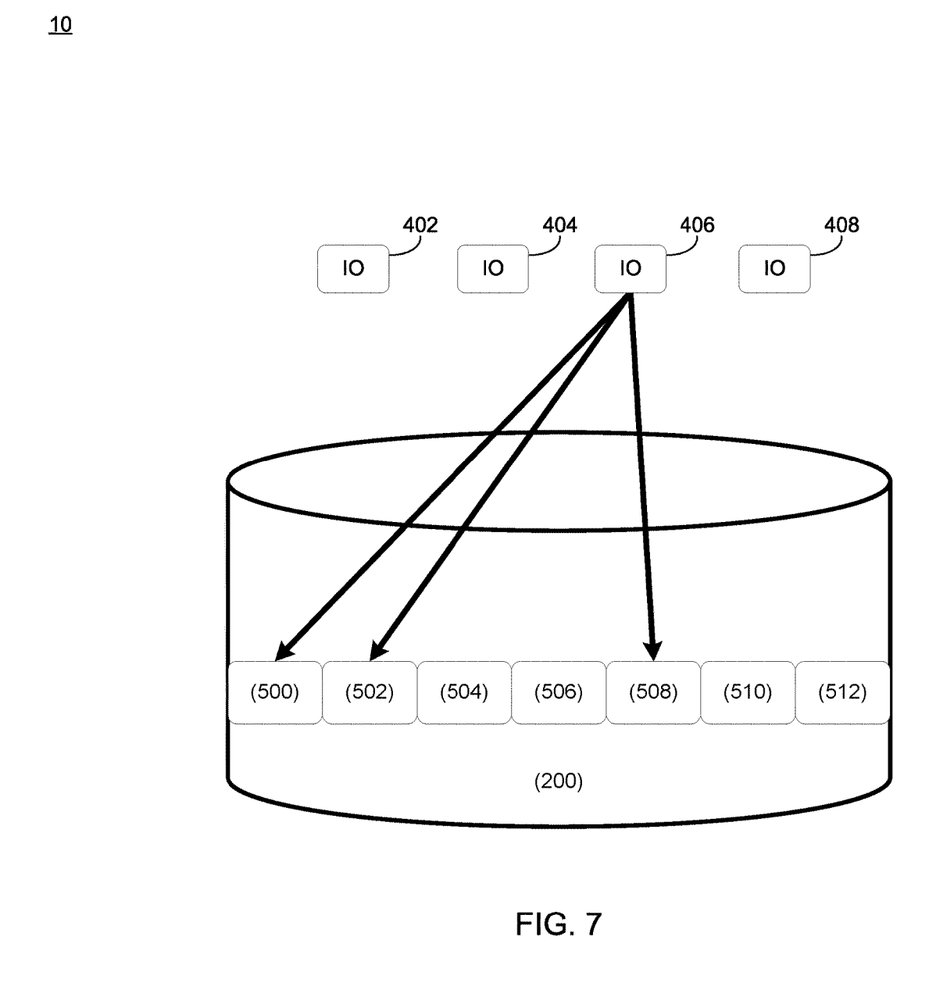
Figure 8:
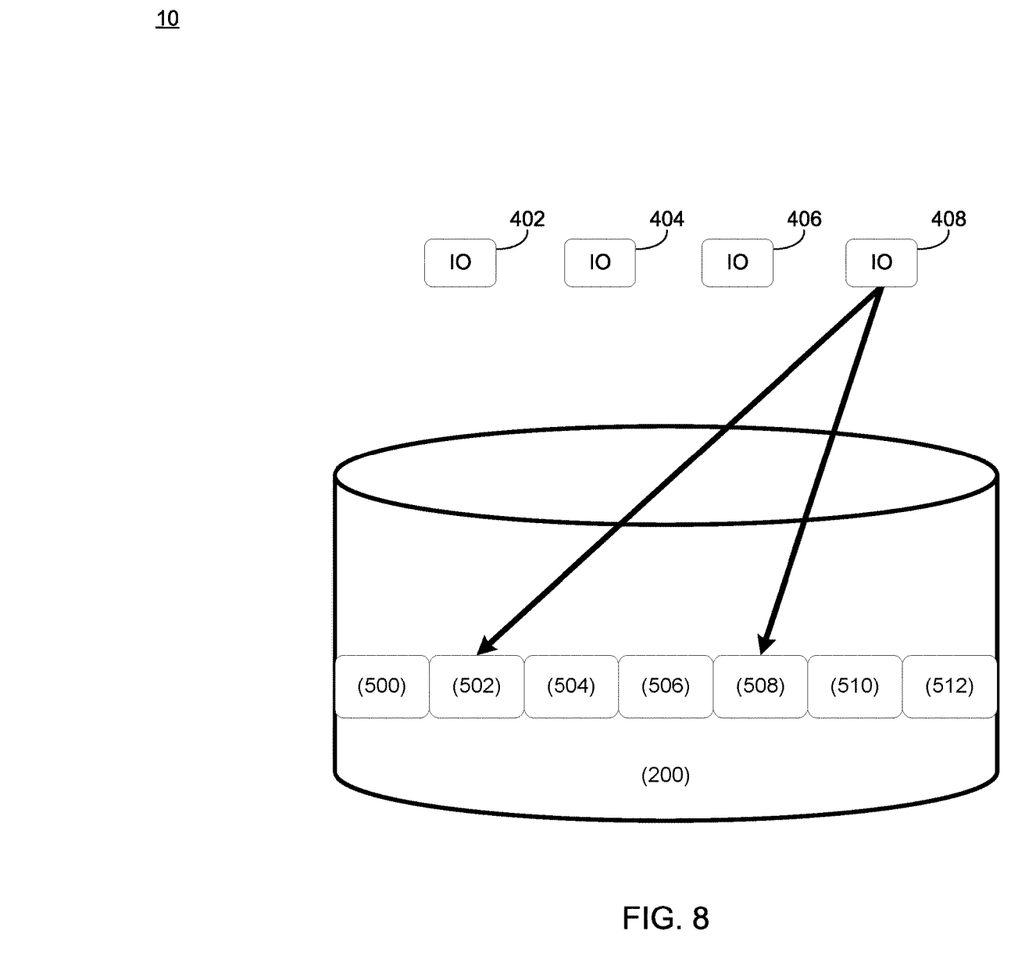

As shown in FIGS. 5-8, storage object 200 is shown to include data organized in e.g., seven portions (e.g., portions 500, 502, 504, 506, 508, 510, 512). However, it will be appreciated that this is for example purposes only and that storage object 200 may include any number or amount of data (e.g., defined in terms of storage capacity or number of data portions). In the example of FIG. 5, IO request 402 includes a request to read from and/or write to portions 500,

502. As such, portions 500 and 502 are active during IO request 402. In the example of FIG. 6, IO request 404 includes a request to read from and/or write to portions 500, 502. As such, portions 500 and 502 are active during IO request 404. In the example of FIG. 7, IO request 406 includes a request to read from and/or write to portions 500, 502, 508. As such, portions 500, 502, 508 are active during IO request 406. In the example of FIG. 8, IO request 408 includes a request to read from and/or write to portions 502 and 508. As such, portions 502 and 508 are active during IO request 408. Accordingly, portion 502 is the most active, while portions 500 and 508 are active for the majority of the time interval. In this example, the active data set during the particular time interval is portions 500, 502, and 508.

Referring again to FIG. 4, using IO features 418, 420, 422, 424 generated from historical IO requests 402, 404, 406, 408, active data set forecasting process 10 uses a machine learning model (e.g., machine learning model 426) to forecast 304 an active data set for a particular future time interval (e.g., active data set forecast 428). Forecasting 304 the active data set for a particular future time interval generally includes using machine learning model 426 to determine an active data set of a storage object that has at least a threshold probability of being active within the particular future time interval. The future time interval may be a default amount of time or may be user-defined when using machine learning model 426.

A machine learning model (e.g., machine learning model 426) may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure.

In some implementations, active data set forecasting process 10 forecasts 304 the active data set for a storage object (e.g., storage object 200) by processing IO features 418, 420, 422, 424 associated with the particular future time interval using machine learning model 426. The active data set forecast (e.g., active data set forecast 428) indicates which portions of storage object 200 and/or an amount of data within storage object 200 is predicted to be active (i.e., accessed by IO requests for reading and/or writing) during the future time interval.

In some implementations, active data set forecasting process 10 forecasts 306 an active data set for a storage system for the particular future time interval by aggregating the forecast active data set for each storage object of the storage system for the particular future time interval. For example, active data set forecasting process 10 may generate a plurality of forecasts for active data sets for various storage objects of the storage system for the same or different particular future time intervals. Accordingly, active data set forecasting process 10 aggregates the active data set forecasts (e.g., active data set forecast 428) for each storage object for the same future time interval to forecast 306 an active data set across the storage system (e.g., storage system 12). For example, a user of machine learning model 426 may select a particular future time interval for forecasting an active data set for the storage system or specific portions of the storage system. In one example, active data set forecasting process 10 forecasts 304 an active data set for particular storage objects associated with specific users and/or specific storage drives. As will be discussed in greater detail below, active data set forecasting process 10 may allocate storage resources within the storage system, perform resource balancing, predict storage system usage, etc. based upon, at least in part, the active data set for particular storage objects and/or for the storage system generally.

In some implementations, active data set forecasting process 10 allocates 308 an amount of cache storage capacity for caching user data based upon, at least in part, the forecasting of the active data set for the storage system. For example, active data set forecasting process 10 uses active data forecasts for storage system and/or particular portions of the storage system to dynamically allocate an amount of cache storage capacity for caching user data over time (e.g., frontend cache memory system 122 and/or backend cache memory system 124 storage capacity). In one example, suppose that during a first future time interval, active data set forecasting process 10 forecasts 306 that active data set increases in size (e.g., increases in the amount of data actively being accessed) by e.g., a factor of three. In this example, active data set forecasting process 10 dynamically allocates additional storage resources for the cache (e.g., frontend cache memory system 122 and/or backend cache memory system 124) to compensate for the increased active data set size. Now suppose that during a second future time interval, active data set forecasting process 10 forecasts 306 that active data set decreases in size by e.g., a factor of two. In this example, active data set forecasting process 10 dynamically allocates storage resources from the cache (e.g., frontend cache memory system 122 and/or backend cache memory system 124) to compensate for the decreased active data set size. In some implementations, active data set forecasting process 10 dynamically allocates the amount of cache storage capacity for caching user data for different client types (i.e., block storage vs. file storage). For example, when an active data set is forecasted for more block storage clients, active data set forecasting process 10 allocates cache storage capacity for block storage. In another example, when an active data set is forecasted for more file storage clients, active data set forecasting process 10 allocates cache storage capacity for file storage.

In some implementations, active data set forecasting process 10 allocates 310 an amount of metadata to manage user data based upon, at least in part, the forecasting of the active data set for the storage system. For example, active data set forecasting process 10 uses the size of the active data set to determine the amount of metadata that the storage system allocates to manage the user data. Metadata is used to guide the storage system in the location and management of user data. For example, if the storage of user data within storage object 200 includes performing deduplication by removing e.g., four kilobytes of zeros starting at a particular address, metadata associated with the user data includes information to provide the removed zeros for that address if requested. In one example, active data set forecasting process 10 allocates metadata at a ratio of 128:1 (e.g., 128 units of metadata to 1 unit user data). Accordingly, as the active data set size increases over time, active data set forecasting process 10 dynamically allocates 310 additional metadata. Similarly, as the active data set decreases over time, active data set forecasting process 10 dynamically allocates 310 the amount of metadata to a reduced amount. In some implementations, the allocated metadata is stored on fast dynamic RAM (DRAM) memory to ensure adequate performance.

In some implementations, active data set forecasting process 10 performs 312 resource balancing in the storage system among a plurality of storage nodes based upon, at least in part, the forecasting of the active data set for the storage system. For example, in a multi-node storage cluster where there are several storage nodes with different memory configurations, active data set forecasting process 10 uses long-term active data set forecasting to perform 312 resource balancing (i.e., by managing the assignment of storage objects to particular storage nodes and/or redistributing IO requests among different storage nodes for storage objects in the active data set).

In one implementation of the present disclosure, 91 traces were obtained from actual customer workloads, including about 45,000 volumes. Training and testing data were created based on an 85:15 split (i.e., with 38,000 volumes used for training of machine learning model 426), and about 6,700 volumes were used for testing. In this example, a Random Forest (RF) regression model was built using the IO features described above. Referring to Table 2 below, a machine learning model (e.g., machine learning model 426) is compared with a simple moving average (SMA) method (an arithmetic moving average calculated by adding new traces and then dividing that figure by the number of time periods in the calculation average). As shown on the bottom "Total" row in Table 2, machine learning model 426 using active data set forecasting process 10 (represented by "ML Predicted ADS" and "ML MAPE") had a 1.92% overall error in forecasting the active data set for the entire storage system (all the volumes). In comparison, SMA had a 21.27% overall error. When considering the results for individual volumes, the SMA method was prone to large errors in some cases (e.g., Trace4 and trace 10), especially with low-activity volumes, but also had a 96% error with the highly active Trace12. As shown in Table 2, active data set forecasting process 10 is more stable, and with active volumes, where active data set forecasting process 10 has more data to work with, the highest error was 25% (Trace9).

In another implementation of the present disclosure measuring the relationship between the temperature (represented by total bandwidth) of a storage object and the active data set of the storage object, and the results are shown in Table 3. While temperature and active data sets are related, they are not identical. For example, if a certain logical address (LBA) range is read or written to e.g., ten times, the related temperature would increase by a factor of ten, however the active data set would not change. For some traces (e.g., Trace11 and Trace12) the temperature and active data set values were similar, but for other traces (e.g., Trace1, Trace8 and Trace9) the temperature and active data set values were quite different. When the values differ significantly (i.e., the temperature is much greater than the active data set value), it is likely that there were repeated IO requests accessing the same address range, contributing to the temperature but not to the active data set. When the values for the temperature and the active data set are similar, it is likely because most IO requests access new data ranges, and thus contribute to both the temperature as well as the active data set. This may be related to a high percentage of sequential IO requests in the workload.

TABLE 3

| Trace File | Actual ADS in megabytes (MB) | Total Bandwidth in megabytes (MB) | % Repeatability |
|---|---|---|---|
| Trace1 | 395 | 1,491 | 73.5% |
| Trace2 | 8,238 | 19,223 | 57.1% |
| Trace3 | 25,826 | 33,016 | 21.8% |
| Trace4 | 20,890 | 40,563 | 48.5% |
| Trace5 | 1,351 | 6,427 | 79.0% |
| Trace6 | 1,630 | 4,582 | 64.4% |
| Trace7 | 1,101 | 2,109 | 47.8% |
| Trace8 | 73,055 | 135,907 | 46.2% |
| Trace9 | 181,527 | 334,936 | 45.8% |
| Trace10 | 401 | 3,482 | 88.5% |
| Trace11 | 446,193 | 476,101 | 6.3% |
| Trace12 | 53,142 | 59,836 | 11.2% |

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

TABLE 2

| Trace File | Actual ADS (MB) | ML Predicted ADS (MB) | SMA Predicted ADS (MB) | ML MAPE | SMA MAPE |
|---|---|---|---|---|---|
| Trace1 | 395 | 470 | 417 | 19% | 5% |
| Trace2 | 8,238 | 12,296 | 21,262 | 49% | 158% |
| Trace3 | 25,826 | 3,173 | 3,523 | 88% | 86% |
| Trace4 | 20,890 | 21,765 | 21,800 | 4% | 4% |
| Trace5 | 1,351 | 2,260 | 31,645 | 67% | 2242% |
| Trace6 | 1,630 | 2,592 | 2,920 | 59% | 79% |
| Trace7 | 1,101 | 710 | 1,087 | 35% | 1% |
| Trace8 | 73,055 | 90,121 | 92,260 | 23% | 26% |
| Trace9 | 181,527 | 226,740 | 237,933 | 25% | 31% |
| Trace10 | 401 | 781 | 6,987 | 95% | 1643% |
| Trace11 | 446,193 | 414,094 | 462,747 | 7% | 4% |
| Trace12 | 53,142 | 54,394 | 104,260 | 2% | 96% |
| Total | 813,749 | 829,398 | 986,841 | 1.92% | 21.27% |

Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
processing a plurality of historical input/output (IO) requests associated with a storage object of a storage system;
generating a plurality of IO features using the plurality of historical IO requests;
forecasting an active data set for the storage object for a particular future time interval using a machine learning model based upon, at least in part, the plurality of IO features by aggregating the forecast active data set for each storage object of the storage system for the particular future time interval; and
allocating an amount of metadata to manage user data based upon, at least in part, the forecasting of the active data set for the storage system, wherein the amount of metadata is allocated at a ratio to user data defined based upon, at least in part, an active data set size.

2. The computer-implemented method of claim 1, wherein the active data set for a storage object is a set of data within the storage object that is actively being read and/or written by one or more IO requests.

3. The computer-implemented method of claim 1, wherein the plurality of IO features include one or more of:
an average amount of time between consecutive IO requests during a time interval;
a total amount of IO requests during the time interval;
a total amount of bandwidth during the time interval;
an average IO request size during the time interval;
an average amount of time between consecutive read IO requests during the time interval;
a frequency of activity during the time interval; and
an average amount of time between active time intervals of the plurality of time intervals.

4. The computer-implemented method of claim 1, further comprising:
allocating an amount of cache storage capacity for caching user data based upon, at least in part, the forecasting of the active data set for the storage system.

5. The computer-implemented method of claim 1, further comprising:
performing resource balancing in the storage system among a plurality of storage nodes based upon, at least in part, the forecasting of the active data set for the storage system.

6. A computer program product residing on a non-transitory computer readable medium having a plurality of instructions stored thereon which, when executed by a processor, cause the processor to perform operations comprising:
processing a plurality of historical input/output (IO) requests associated with a storage object of a storage system;
generating a plurality of IO features using the plurality of historical IO requests;
forecasting an active data set for the storage object for a particular future time interval using a machine learning model based upon, at least in part, the plurality of IO features by aggregating the forecast active data set for each storage object of the storage system for the particular future time interval; and
allocating an amount of metadata to manage user data based upon, at least in part, the forecasting of the active data set for the storage system, wherein the amount of metadata is allocated at a ratio to user data defined based upon, at least in part, an active data set size.

7. The computer program product of claim 6, wherein the active data set for a storage object is a set of data within the storage object that is actively being read and/or written by one or more IO requests.

8. The computer program product of claim 6, wherein the plurality of IO features include one or more of:
an average amount of time between consecutive IO requests during a time interval;
a total amount of IO requests during the time interval;
a total amount of bandwidth during the time interval;
an average IO request size during the time interval;
an average amount of time between consecutive read IO requests during the time interval;
a frequency of activity during the time interval; and
an average amount of time between active time intervals of the plurality of time intervals.

9. The computer program product of claim 6, wherein the operations further comprise:
allocating an amount of cache storage capacity for caching user data based upon, at least in part, the forecasting of the active data set for the storage system.

10. The computer program product of claim 6, wherein the operations further comprise:
performing resource balancing in the storage system among a plurality of storage nodes based upon, at least in part, the forecasting of the active data set for the storage system.

11. A computing system comprising:
a memory; and
a processor configured to process a plurality of historical input/output (IO) requests associated with a storage object of a storage system, wherein the processor is further configured to generate a plurality of IO features using the plurality of historical IO requests, wherein the processor is further configured to forecast an active data set for the storage object for a particular future time interval using a machine learning model based upon, at least in part, the plurality of IO features by aggregating the forecast active data set for each storage object of the storage system for the particular future time interval, and wherein the processor is further configured to allocate an amount of metadata to manage user data based upon, at least in part, the forecasting of the active data set for the storage system, wherein the amount of metadata is allocated at a ratio to user data defined based upon, at least in part, an active data set size.

12. The computing system of claim 11, wherein the active data set for a storage object is a set of data within the storage object that is actively being read and/or written by one or more IO requests.

13. The computing system of claim 11, wherein the plurality of IO features include one or more of:
an average amount of time between consecutive IO requests during a time interval;
a total amount of IO requests during the time interval;
a total amount of bandwidth during the time interval;
an average IO request size during the time interval;
an average amount of time between consecutive read IO requests during the time interval;
a frequency of activity during the time interval; and an average amount of time between active time intervals of the plurality of time intervals.

14. The computing system of claim 11, wherein the processor is further configured to:
allocate an amount of cache storage capacity for caching user data based upon, at least in part, the forecasting of the active data set for the storage system.

\* \* \* \* \*